United States Patent [19]

Ducker

[11] 4,348,154
[45] Sep. 7, 1982

[54] ADJUSTABLE VANE WINDMILLS

[75] Inventor: William L. Ducker, Lubbock, Tex.

[73] Assignee: Wind Engineering Corporation, Lubbock, Tex.

[21] Appl. No.: 111,251

[22] Filed: Jan. 11, 1980

Related U.S. Application Data

[63] Continuation-in-part of Ser. No. 874,222, Feb. 1, 1978, Pat. No. 4,183,715.

[51] Int. Cl.³ .............................................. F03D 7/04
[52] U.S. Cl. ...................................... 416/43; 416/11; 416/104; 416/141
[58] Field of Search ................. 416/131 R104–106, 416/37, 41, 43, 104, 165, 141, 11

[56] References Cited

U.S. PATENT DOCUMENTS

| | | | |
|---|---|---|---|
| 1,417,000 | 5/1922 | Vogt et al. | 416/165 X |
| 2,054,383 | 9/1936 | Ludewig | 416/202 X |
| 2,094,941 | 10/1937 | Burkhartsmeier | 416/11 X |
| 2,516,576 | 7/1950 | Jacobs | 416/132 B X |
| 4,029,434 | 6/1977 | Kenney | 416/202 X |
| 4,066,911 | 1/1978 | Sarchet | 416/165 X |
| 4,084,921 | 4/1978 | Norz | 416/17 |
| 4,183,715 | 1/1980 | Ducker | 416/41 |
| 4,201,514 | 5/1980 | Huetter | 416/132 B X |

FOREIGN PATENT DOCUMENTS

| | | | |
|---|---|---|---|
| 868278 | 12/1941 | France | 416/11 |
| 886632 | 10/1943 | France | 416/131 |
| 908631 | 4/1946 | France | 416/132 B |
| 988883 | 9/1951 | France | 416/41 |
| 2300233 | 10/1976 | France | 416/ |

Primary Examiner—Everette A. Powell, Jr.
Attorney, Agent, or Firm—Ely Silverman

[57] ABSTRACT

A system of rotatably and pivotally mounted radially extended bent supports for radially extending windmill rotor vanes in combination with axially movable radially extended control struts connected to the vanes with semi-automatic and automatic torque and other sensing and servo units provide automatic adjustment of the windmill vanes relative to their axes of rotation to produce mechanical output at constant torque or at constant speed or electrical quantities dependent thereon.

6 Claims, 23 Drawing Figures

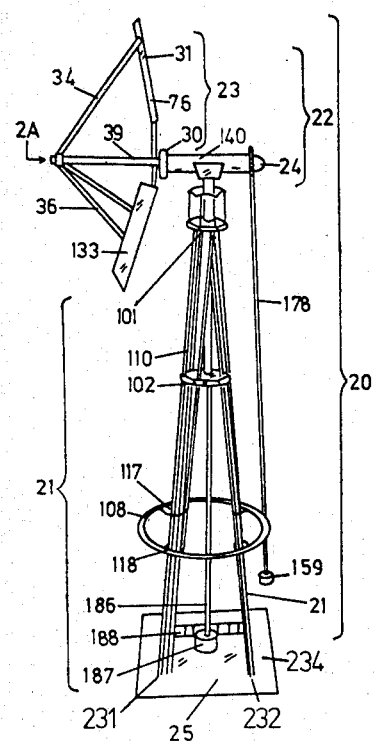
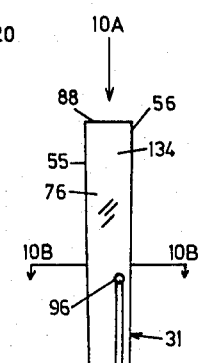
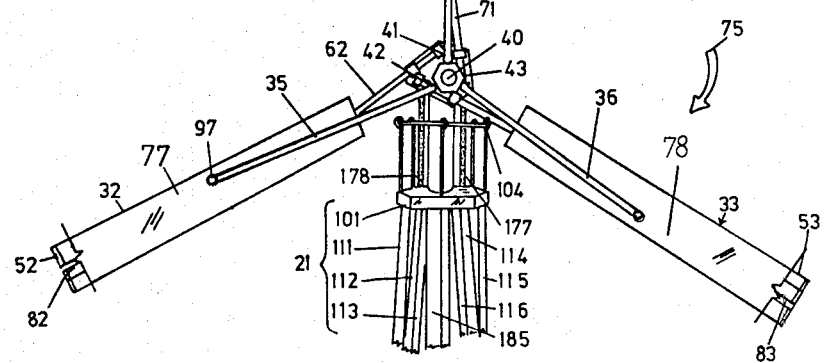
FIG. 1
FIG. 2

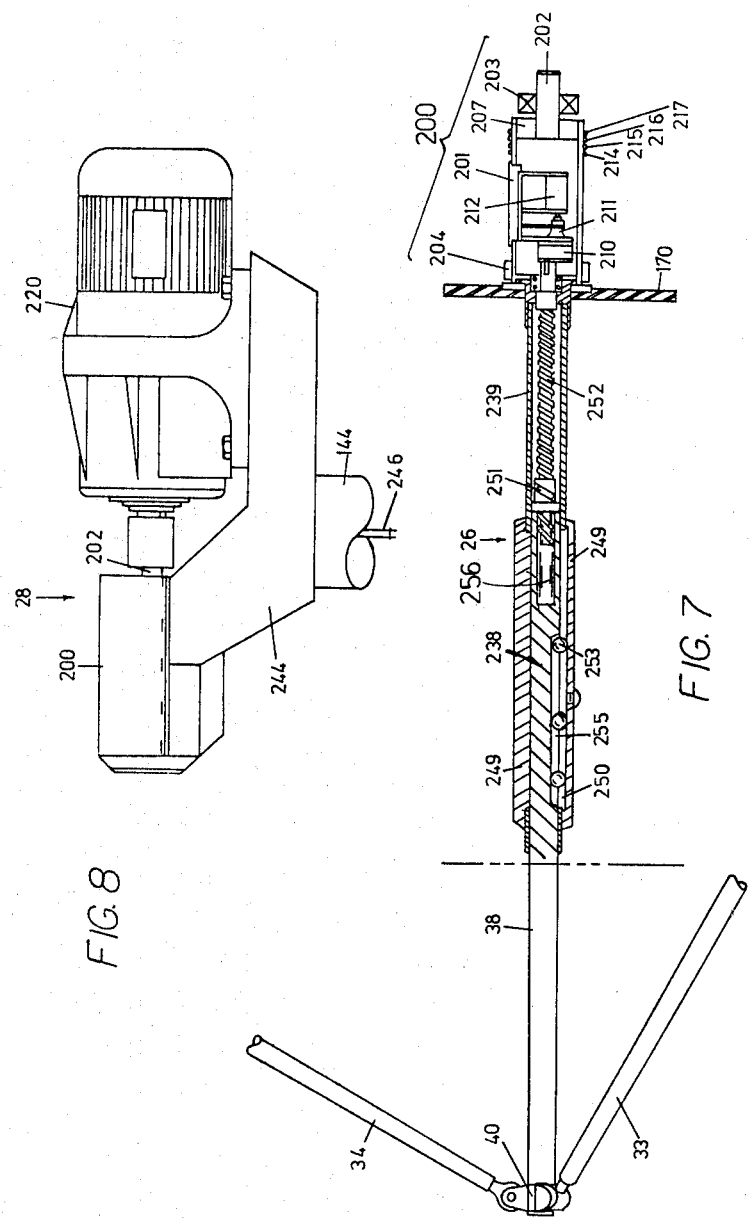

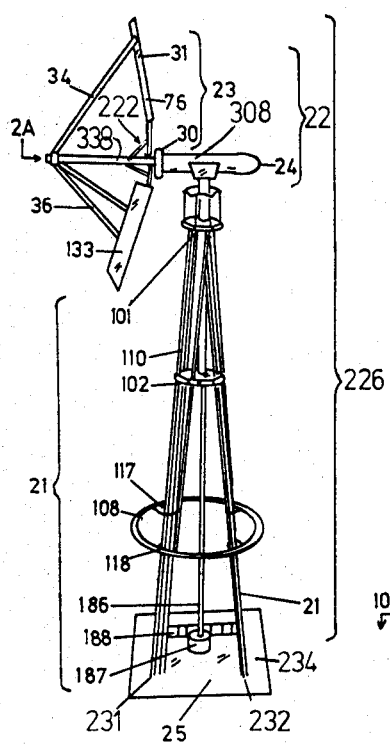
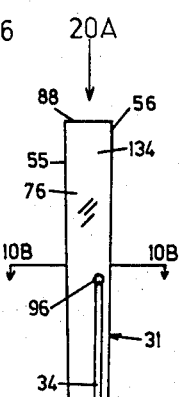
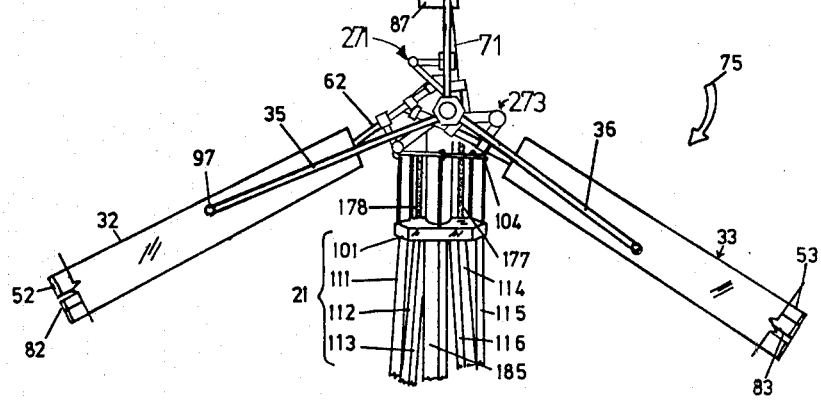
FIG.15
FIG.16

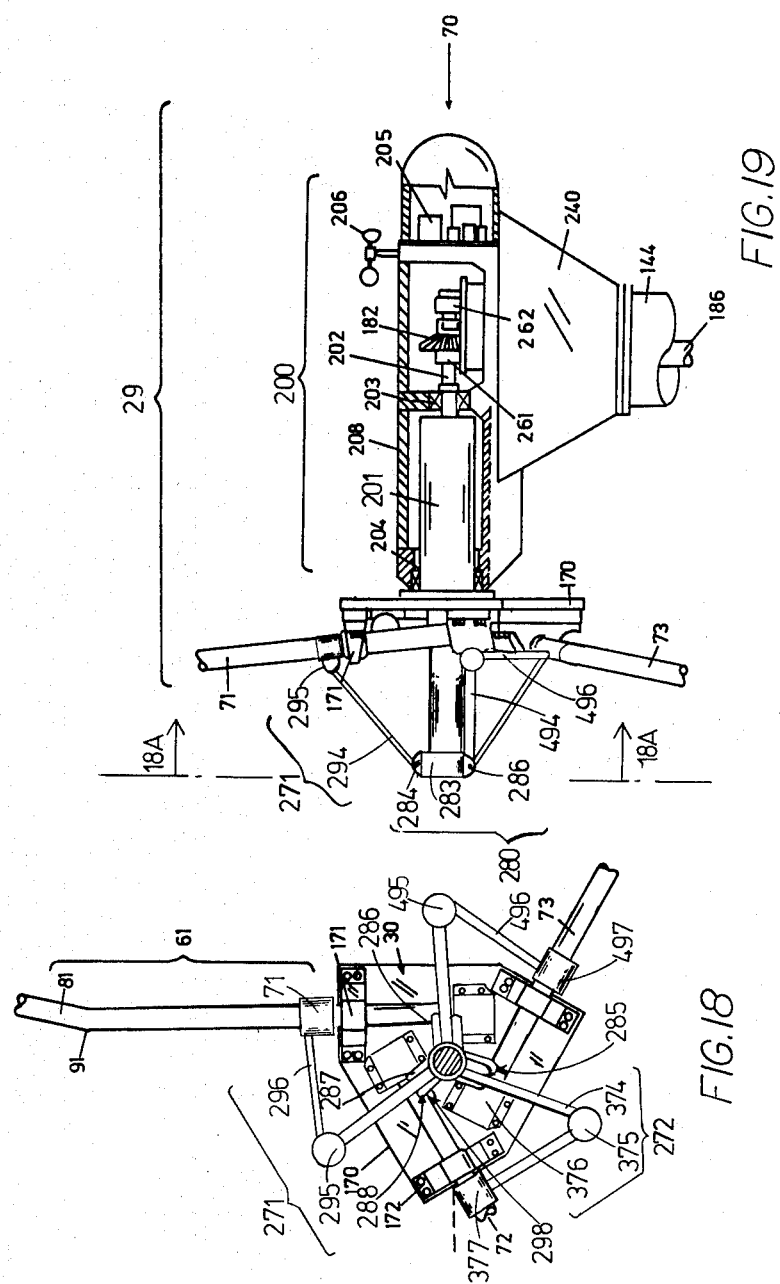

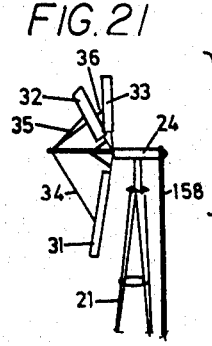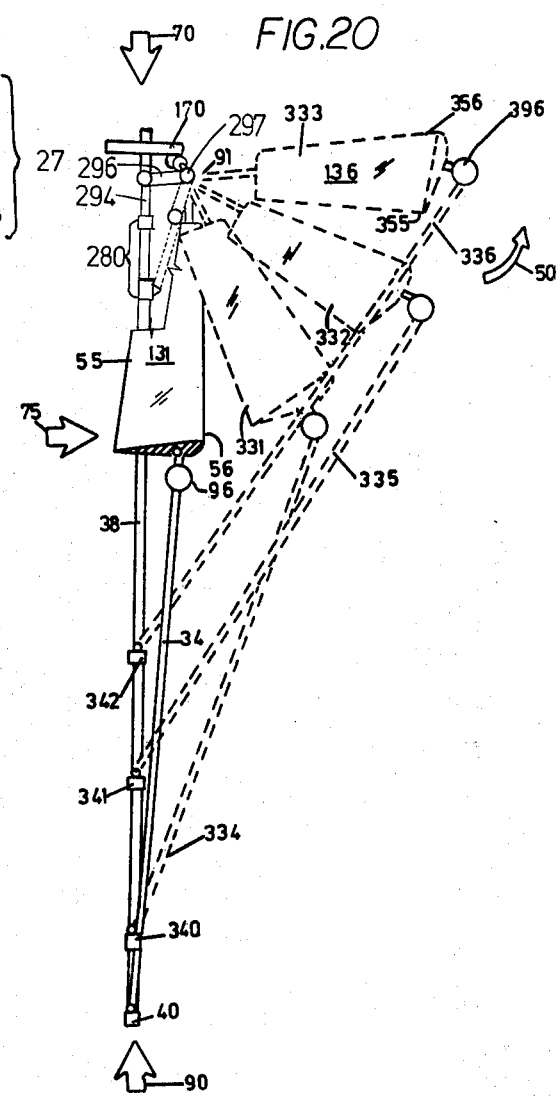

ADJUSTABLE VANE WINDMILLS

CROSS REFERENCE TO RELATED APPLICATIONS

This is a continuation in part application of my patent application Ser. No. 874,222, filed Feb. 1, 1978, now U.S. Pat. No. 4,183,715, issued Jan. 15, 1980.

THE FIELD OF THE INVENTION

The field of art to which this invention pertains is windmills.

BACKGROUND OF THE INVENTION

The varying qualities of the wind have limited the suitability of wind power for applications where output of constant speed or torque, as in electrical generation, is desired. Notwithstanding the long history of human experience with windmills no simple, yet automatically or self-adjusting wind energy conversion apparatus has been heretofore available to automatically provide constant speed or torque output at readily adjusted values from input based on wind power.

SUMMARY OF THE INVENTION

Radially extending windmill vanes are supported for rotation about one axis perpendicular to their length and for pivotal motion about another axis parallel to their length. For such purpose each of these vanes is pivotally mounted on one straight portion of a rigid bent beam and another straight portion—at an angle to the first portion—of each beam is rotatably and pivotally supported on a rotating hub. The orientation of each of the vanes relative to their pivotal axis of movement on the portion of the bent beam to which the vane is attached is fixed by a rigid strut pivotally attached to that vane at one end of the strut; the other end of that strut is connected to a rotatable shaft which is fixed to the hub and extends from the hub along the axis of rotation of the hub and the beams supported thereon. The distance from the rotating hub to the point of attachment of each strut to the shaft is adjustable. Adjustment of the position of the point of attachment of the shaft to the struts serves to adjust and hold each vane at variable orientations relative to the axis of rotation of the vanes and beams and relative to the pivotal axes of the vanes on the beams. Such orientation determining apparatus is responsive to conditions such as torque applied to or desired from the rotating vanes and/or speed desired from such rotating vanes.

A synchronizing assembly is provided to improve maintenance of equality of angle of all vane assemblies to the axis of rotation of the vanes. A variety of assemblies for positioning of the vanes control shaft are disclosed.

BRIEF DESCRIPTION OF THE DRAWINGS

FIG. 1 is a side and top oblique view of an apparatus according to this invention.

FIG. 2 is a slightly oblique end view along the direction of arrow 2A of FIG. 1 and showing the blades in their run position.

FIG. 7 is a diagrammatic vertical sectional view of parts of the vane control assembly according to this invention shown in FIGS. 3 and 6.

FIG. 8 is a diagrammatic view of portions of another embodiment of operating apparatus.

FIG. 15 is an overall side and top oblique view of another apparatus, 226, according to this invention comprising synchronizing apparatus 222 and control assembly 224.

FIG. 16 is an overall end view along the direction of arrow 16A of FIG. 15 and showing the blades in the run position of apparatus 226.

FIG. 18 is a rear end view of the hub 30 and related parts of the synchronization assembly 222 as seen along direction of arrow 18A of FIG. 22 and section 18A—18A of FIG. 19.

FIG. 19 is a vertical longitudinal diagrammatic sectional and side view of parts of embodiment 29 of apparatus, which parts are located in zone 19A of FIG. 17.

FIG. 20 is a diagrammatic top view along direction of arrow 20A of FIGS. 16 and 17 and also along the horizontal transverse section 20B—20B of FIG. 16 to illustrate sequential positions of rotor blades and related parts connected thereto including the synchronization assembly 222 during operation of apparatuses of FIGS. 15-22.

FIG. 21 shows a portion of the apparatus 27, the apparatus 20 plus the synchronization assembly 222, in the position of its parts at which position blade 31 extends vertically downward from hub 30.

DESCRIPTION OF THE PREFERRED EMBODIMENTS

Figure 3:
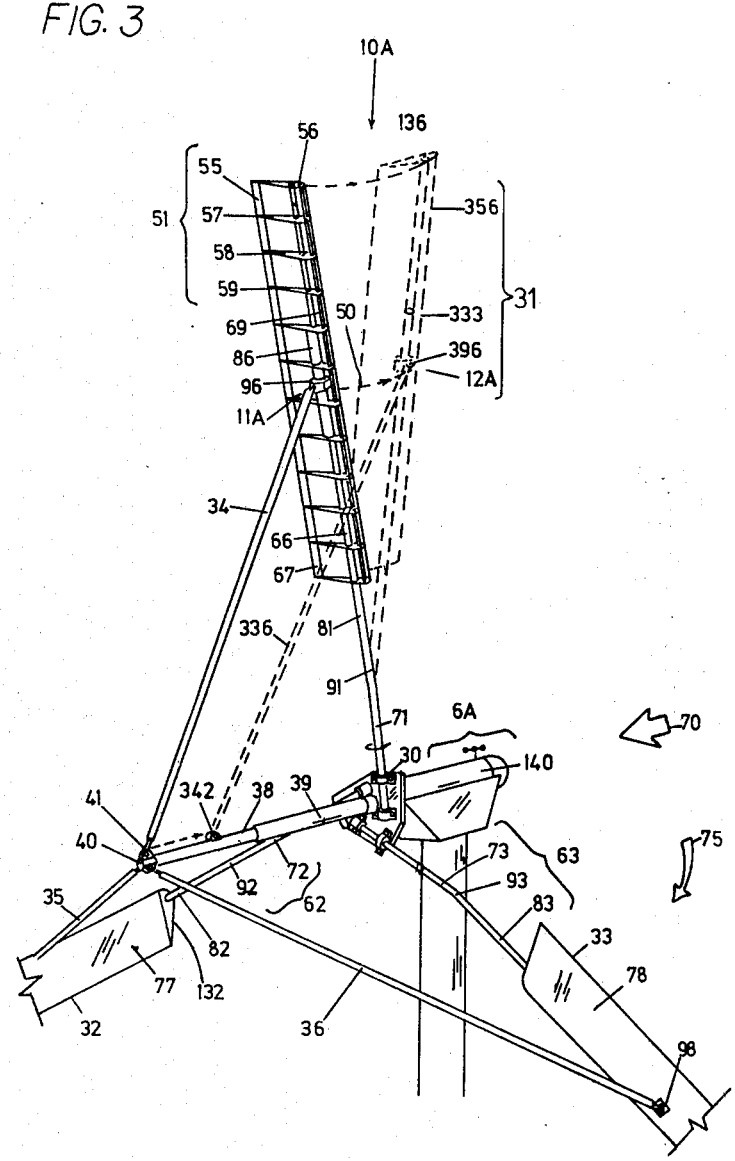
FIG. 3 is a perspective view showing in full lines the rotor blades in their run position, and showing also, in dashed lines, one blade (31) in its feathered position.

The apparatus 20 comprises a frame assembly 21 and a rotor and control assembly 22. The rotor and control assembly 22 is composed of a rotor assembly 23 and a control assembly 24.

The rotor and control assembly 22 is rotatably supported on the frame assembly 21. The frame assembly 21 sets on the ground 25 and is supported thereby.

The apparatuses disclosed herein are modifications and improvements of the apparatus 20 as below set out.

(1) Apparatus 20 is shown in FIGS. 1, 2, 4, 5, and 9-14.

Figure 6:
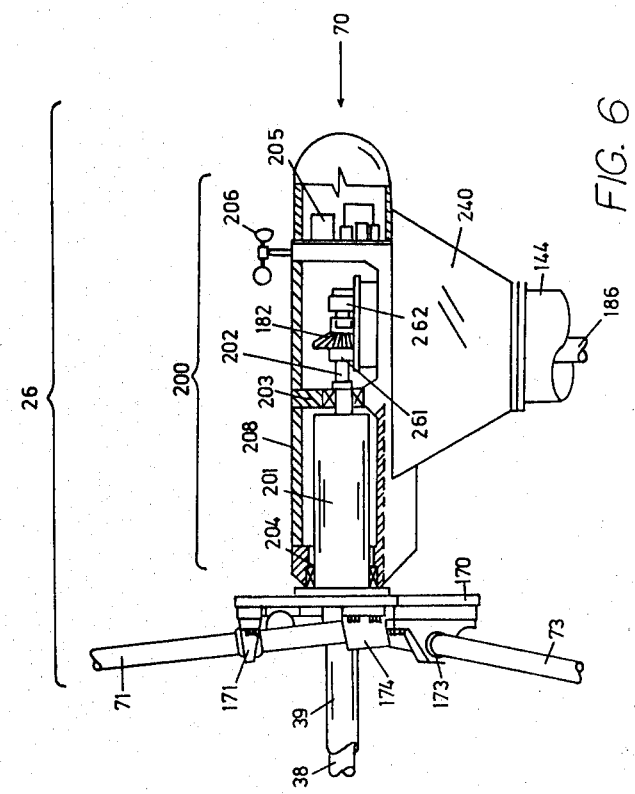
FIG. 6 is a vertical longitudinal diagrammatic section of parts of the embodiment of the apparatus which parts are located in zone 6A of FIG. 3.

(2) Apparatus 26, shown in FIGS. 3, 6, and 7 comprises a modification of the control assembly 24 in apparatus 20.

(3) Apparatus 28, shown in FIG. 8 comprises another modification of control assembly 24 of apparatus 20.

Figure 22:
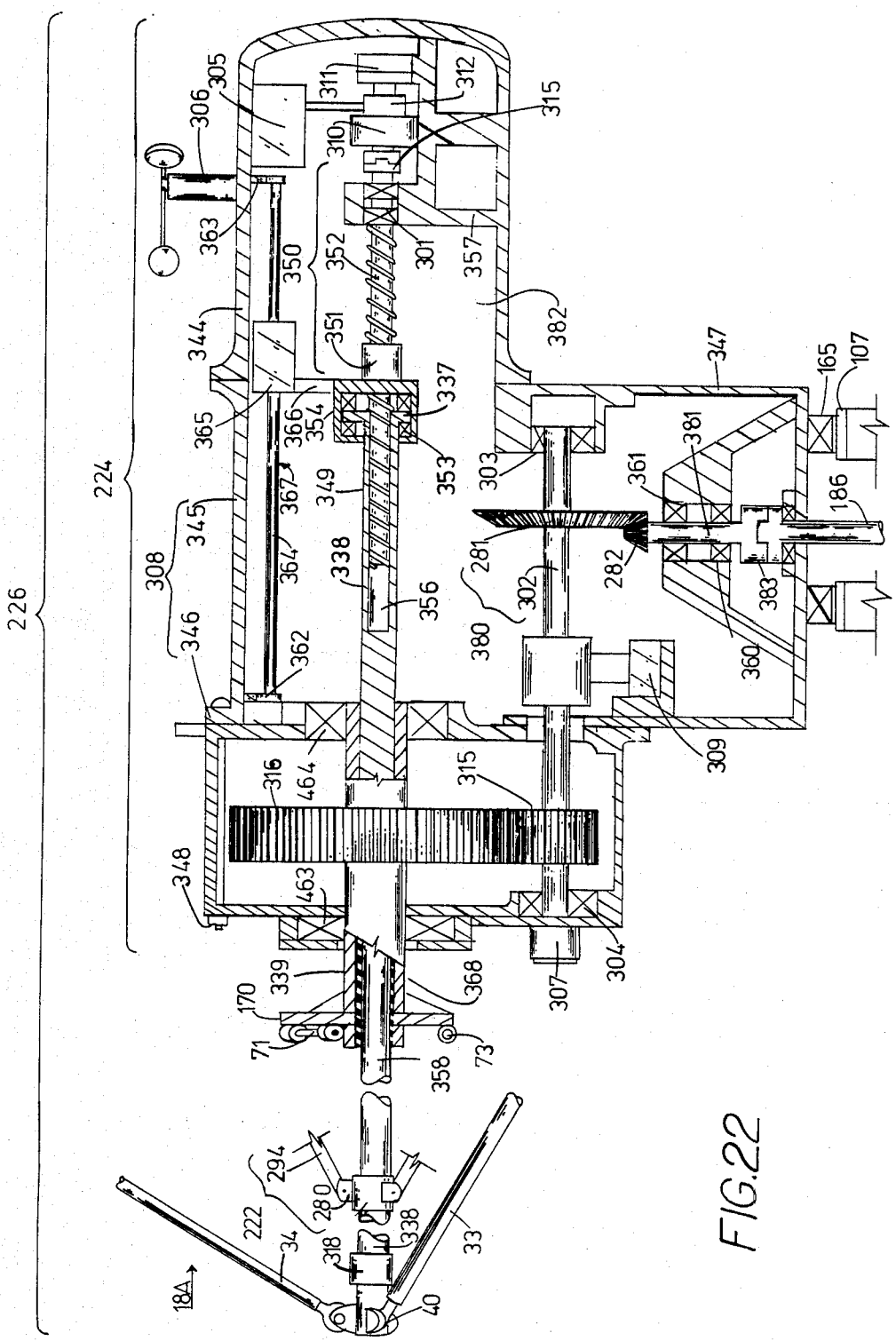
FIG. 22 is a central vertical longitudinal diagrammatic sectional view of the rotor control assembly 224 of apparatus 226 of FIG. 15 and related parts operatively connected thereto.

(4) Apparatus 226, shown in FIGS. 15 and 22, comprises changes in the rotor assembly and in the control assembly of apparatus 20. Apparatus 226 comprises the apparatus 20 plus synchronization assembly 222 and a control assembly 224.

(5) Apparatus 27, shown in FIG. 21, comprises changes in the rotor assembly 22 of apparatus 20 by inclusion of synchronization assembly 222.

Figure 17:
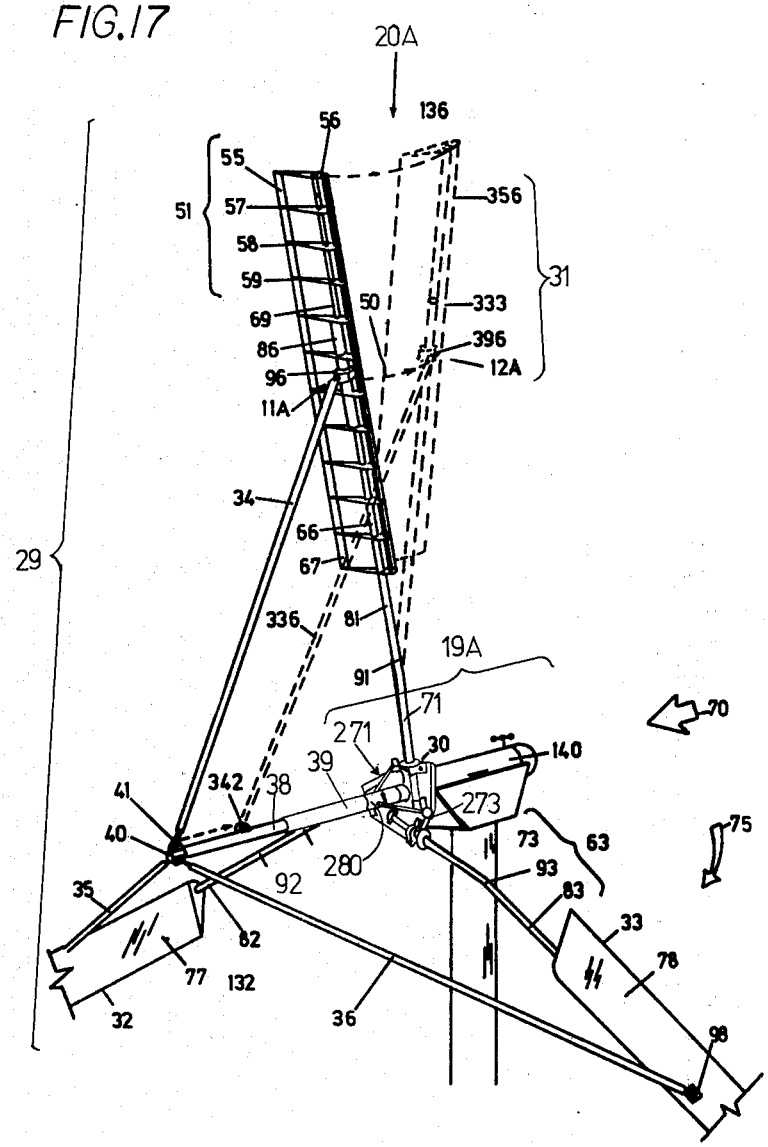
FIG. 17 is a perspective view showing in full lines the rotor blades and synchronizing assembly in the run position thereof, and showing also, in dashed lines, one blade in its feathered position for apparatus 26 and synchronizing assembly 22, which combination is apparatus 29.

(6) Apparatus 29, shown in FIGS. 17 and 19, comprises changes in the rotor assembly of apparatus 26 by including the synchronization assembly 222 in the rotor assembly 22. The synchronization assembly, which is common to several apparatuses, is shown in FIGS. 16, 18 and 20.

The rotor assembly 23 comprises a hub 30, rotor blades 31-33, struts 34-36, a blade control shaft 38 and a shaft support sleeve 39, as major components. The rotor blades 31, 32 and 33 are rotatably supported on the hub 30.

The hub 30 is supported on the shaft support sleeve 39 and the sleeve 39 is supported on the control assembly 24.

Figure 5:
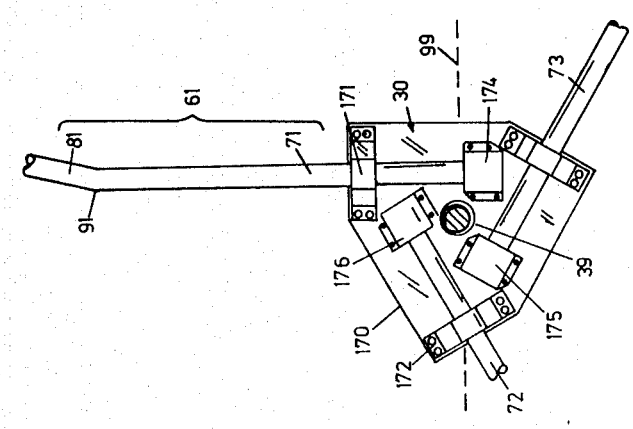
FIG. 5 is an end view of the rear of hub 30 and related parts.

Sleeve 39 is rotatably supported on the shell of assembly 24 in bearings as 161 and 162. Shaft 38 is moved along the length of sleeve 39 by parts of assembly 24. The hub 30 comprises a rigid plate 170 firmly fixed to sleeve 39 and spar shaft journal bearings 171, 172 and 173 and spar shaft seats 174, 175 and 176 for straight spar shaft portions 71, 72 and 73, respectively. The bearings 171-173 pivotally hold the spar shaft portions 71, 72 and 73 in a radially symmetrical and tangentially extending array as shown in FIGS. 2 and 3 and 5. Shaft 38 is rigid and straight and supported by rigid cylindrical sleeve 39 for longitudinal motion along the length of hollow sleeve 39 and is co-axial with sleeve 39.

Collar 40 is a rigid annulus or ring and is firmly fixed to shaft 38 at its rear end and comprises and supports three universal strut-collar joints, 41, 42 and 43. Rigid struts 34-36 extend from universal strut-vane joints 96, 97 and 98 on the blades 31, 32 and 33 respectively to joints 41, 42 and 43. Joints 41, 42 and 43 respectively pivotally join the central end of each of struts 34, 35 and 36 to the collar 40 and are equispaced around the collar 40.

Each of the rotor blades or vanes 31, 32 and 33 comprises a rigid blade frame 51, 52 and 53 respectively and a rigid vane spar 61, 62 and 63 respectively. Each frame as 51 is like the other frames 52 and 53 and each of the spars is like the other spars.

Figure 4:
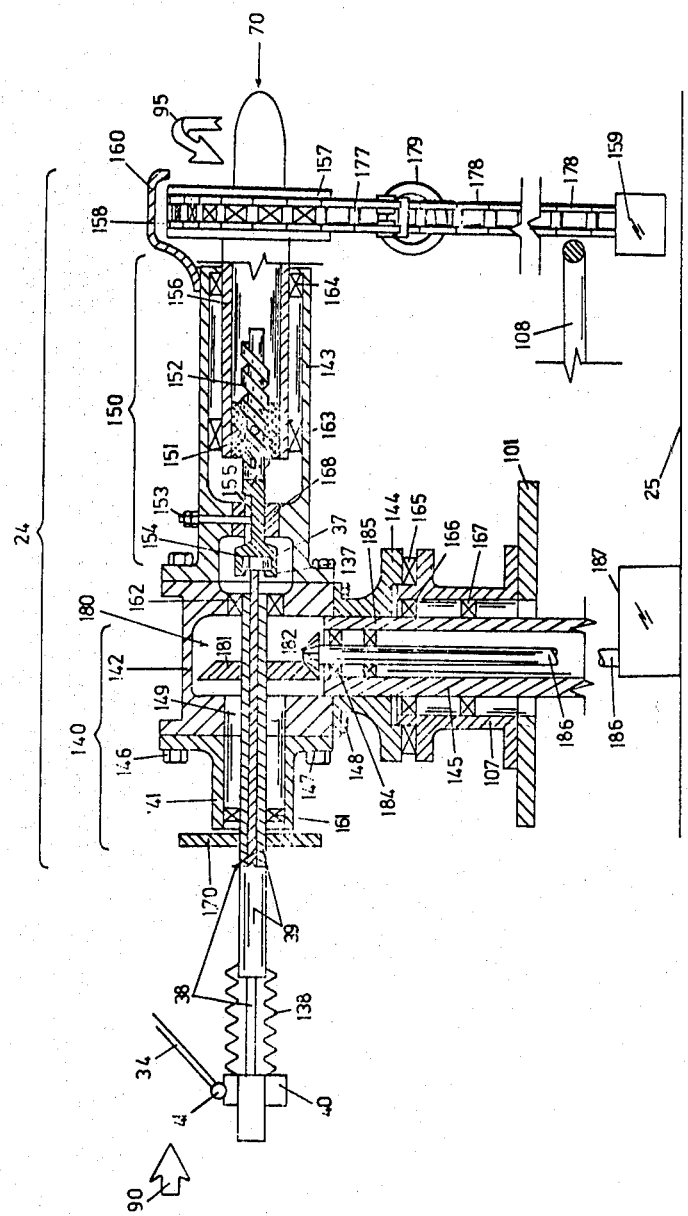
FIG. 4 is a central vertical longitudinal diagrammatic section view of the rotor control assembly of apparatus of FIG. 1 and related parts operatively connected thereto.

Each spar 61, 62 and 63 has a straight part 71, 72 and 73 and a bent portion 81, 82 and 83 respectively. The bent and the straight portions are joined at bends 91, 92 and 93 respectively for each of the spars 71, 72 and 73. Each of the straight portions is rotatably supported in hub 30 at journals 171-173 and on supports 174-176 as shown in FIGS. 3 and 5. Each of the straight parts of each of the shafts 71, 72 and 73 is alike and extends in a plane at 84° to the axis of the shaft 38 and sleeve 39. Such planes extend downwardly and windwardly (rightwards as shown in FIGS. 1, 4 and 6) and in a clockwise (as shown in FIGS. 2, 3 and 5) direction.

The peripheral portion 81, 82 and 83 of each spar is alike and is a part of and firmly attached to a frame as 51, 52 and 53 of the corresponding blade. Each of the blades 31, 32 and 33 have the same structure; accordingly the description given for blade 31 applies to the other blades or vanes.

Each rotor blade frame as 51 has a trailing edge 55 and a leading edge 56. Each frame as 51 is formed of several rigid transversely extending ribs 57, 58 and 59 and parallel rigid longitudinal members as 66, 67 and 69 firmly joined together and arrayed as in FIGS. 2 and 3 and covered by a firm smooth imperforate plastic, wood, metal or cloth sheet as 76, 77 and 78 respectively so as to form an effective airfoil.

On each blade or vane, as 31, 32 and 33, its cover (76, 77 or 78) forms a front blade or vane windward surface as 131, 132 and 133 respectively and a rear blade or vane surface, as 134 on rotor blade 31, which rear surface is located on the opposite side of the blade from the front surface as 131. The position of surface 131 of the blade 31 is shown as 136 in the shifted position of blade 31 shown as 333 in FIG. 10.

In FIG. 2 end portions of covers 77 and 78 are broken away so that the frames 52 and 53 may be shown. In FIG. 3 the cover is shown as removed from blade 31 so that the structure of the frame 51 may be shown.

Figure 10:
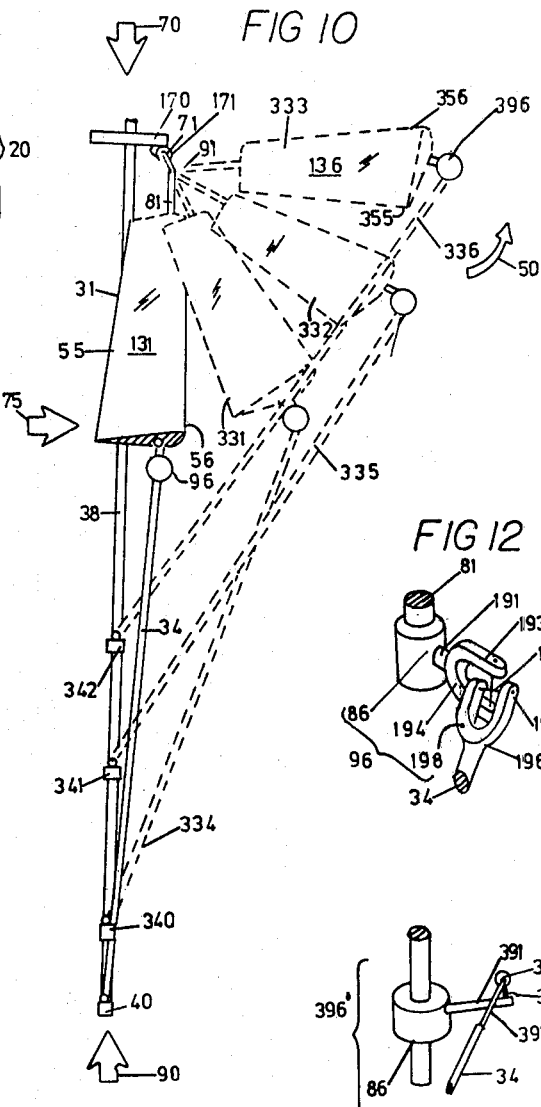
FIG. 10 is a diagrammatic top view along direction of arrow 10A of FIGS. 2 and 3 and, also along the horizontal transverse section 10B—10B of FIG. 2 to illustrate sequential positions of a rotor blade 31 and related parts connected thereto during operation of apparatuses of FIGS. 1-9.
Figure 12:
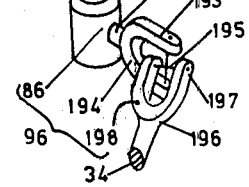
FIG. 12 is a perspective diagrammatic view of joint 96 in zone 12A of FIGS. 3 and 10 showing the strut-vane connector in a more feathered position than in FIG. 11.
Figure 14:
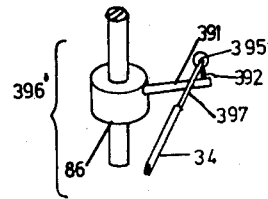
FIG. 14 is a perspective diagrammatic view of another form of strut-vane connector.

Each of the spars as 61, 62 and 63 is rotatably supported at its portions 71, 72 and 73 respectively in the hub 30 as shown in FIGS. 2, 3 and 5. Movement of the control shaft 38 and collar 40 forward along the length of sleeve 39 from a position as 40 to position 342 as shown in FIGS. 3 and 10 causes a rotation of each of the rotor blades as 31 around the axis of the straight portion as 71 of the spar as 61 from the run position of such blade frame as shown in FIGS. 3 and 10 to its feathered position 333 shown in dashed lines in FIGS. 3 and 10. Intermediate positions as 331 and 332 of the rotor blade 31 are also shown in FIG. 10 where position 340 of the collar 40 corresponds to the position of collar 40 in FIG. 3 while in FIG. 10 position of collar 40 is a somewhat more rearwardly moved position of the collar 40 than is shown for collar 40 in FIG. 3.

The path 50 of the blade 31 shown in FIGS. 3 and 10 thus provides not only for a forward motion of the blade frame (from the left in FIG. 3 to the right in FIG. 3 and as shown in FIG. 10) but also, a rotation from the blade orientation relative to the axis of the shaft 38 (which orientation is shown in full lines in FIGS. 2 and 3) to the orientation and position shown in dashed lines in the FIGS. 3 and 10, due to the rotation of the straight portion 71 of the spar 61 in its journal 171, and a consequent rotation of the bent peripheral spar portion 81 which is attached to the ribs of the frame of the vane or rotor blade.

The frame assembly 21 comprises a upper platform 101, a middle platform 102 and a series of rigid vertical post members as 111-116 firmly attached thereto. The frame assembly also includes a ring 108 which is firmly attached by brackets as 117 and 118 to all the vertical post members. The vertical members are rigid beams and are firmly attached to the ground 25 and to the platforms 101 and 102. The upper platform is provided with a railing 104 for the convenience of operators.

The frame assembly 21 comprises four sets each like 231' and 232', each set composed of three post members as 111, 112 and 113 for set 231' and members 114, 115 and 116 for set 232'; each set is generally V-shaped with the apex of such set setting in one corner of a square area as 234' on ground 25 and the other end of each of said set firmly attached at its top to the upper platform 101 and, at an intermediate portion to the middle platform 102 while brackets as 117 and 118 support the ring 108 so that the peripheral surface of that ring provides a smooth circular surface to contact the chain portion 178.

The platform 101 firmly supports a rigid vertically extending pedestal 107 on which the rotor and control assembly 22 is mounted for rotation about a vertical axis of shaft 186. The frame assembly 21 is symmetrical about a vertical assembly axis. That vertical assembly axis is co-axial with the central longitudinal axis of the cylindrical pedestal 107.

Generally, the frame assembly 21 provides a support for the rotor and control assembly 22 and a connection from the output of the rotor assembly 22 to a generator 187. Additionally, the frame assembly provides a minimum resistance to wind passing therethrough and therearound by permitting wind to pass through the spaces between the spaced apart beam members as 111-116. Additionally, the frame assembly 21 provides a support for the ring 108 which acts as a guide for the sprocket chain 178.

The control assembly 24 comprises, in operative combination, a rigid shell subassembly 140, a control shaft subassembly 150 and a power takeoff subassembly 180.

The shell subassembly 140 comprises rigid rear casting 141, a rigid central casting 142, a rigid forward end casting 143 and a lower, shoulder, casting 144. These are firmly joined together by bolts as 146-148. A rigid cylindrical central sleeve 145 is firmly attached to the lower casting 144 and is rotatably located within the pedestal 107. Bearings 161 and 162 fixed in the casing subassembly 140 rotatably support both shaft support sleeve 39 within the cavity 149 of the shell subassembly 140 and the hub exteriorly thereof. Bearings 163 and 164 in casting 143 rotatably support a cylindrical sprocket sleeve 156 within the casting 143.

The bolts as 146-149 firmly hold the elements 141-143 of assembly 140 together and surround a T-shaped shell assembly cavity 149 within the castings 141-145, all of which are hollow.

A ring bearing 165 rotatably supports the shell subassembly 140 on the pedestal 107. Bearings 166 and 167 rotatably locate rigid cylindrical sleeve or tube 145 within the cylindrical pedestal 107 and co-axial therewith. The upper end of tube 145 helps to fixedly locate other parts of the casing subassembly 140 relative to gears 181 and 182.

The lower end of tube or sleeve 145 extends to platform 102 and is rotatably held at that platform by bearings therefor firmly held on or in that platform.

The control shaft subassembly 150 comprises the front portion of the control shaft 38 and the shaft support sleeve 39, a helically grooved nut 151, a helically threaded rigid shaft 152, a sprocket sleeve 156, cap 154 and a bearing 168. The nut 151 is firmly fixed to sprocket shell or tube 156 which is rotatably located in bearings 163 and 164 within the casting 143. The nut 151 has internal helical threads which match the helical threads on the screw shaft 152. Shaft 152 has a slotted cylindrical portion which is smoothly slidably held within the bearing 168 held by a rigid key 153, in form of a bolt, within a keyway or slot in shaft 152 to prevent rotation of shaft 152.

The bearing 168 is not a rotating bearing but provides for longitudinal motion of the shaft 152 along the direction of the axis of the shaft 38. Bearing 168 is firmly located within a shoulder on the casting 143 and that bearing is co-axial with the hole in the nut 151 and with the shaft 152 and with the shaft 38 and sleeve 39.

The cap 154 is C-shaped in section. It has an inturned shoulder 137 and smoothly seats as well as holds and embraces a cylindrical head 37 of shaft 38. Head 37 is rigid and has a greater diameter than shaft 38 and the head 37 is co-axial with and firmly fixed to the rigid shaft 38. A rigid circular sprocket wheel plate 157 is firmly attached to and is co-axial with the rigid cylindrical sprocket shell or sleeve 156 and supports a flexible steel chain 158 at the lower end of which is located weight 159. The chain is located at a horizontal distance from the center of tube 145 (which tube 145 is co-axial with the output power shaft 186) as is the periphery of the ring 108. Accordingly, chain 158 is readily moved around the frame assembly 21 when (a) the direction of wind 70 changes and (b) the rotor and control assembly 22 rotates in response to such change in wind direction and (c) the top portion of chain 158 is moved with sprocket wheel 157 and (d) a lower portion 178 of that chain 158 attached to weight 159 follows the movement of the sprocket wheel without tangling on the frame 21 because it bears on the smooth surfaced circular sectioned and shaped ring 108.

The chain 158 has a longer weight bearing portion 178 and a shorter takeup portion 177 and engages the teeth on the sprocket wheel 157. The longer portion 178 reaches the weight 159 and is firmly connected thereto. The shorter length is attached to a rigid wide circular ring 179 which loosely surrounds the length 178. A circular rigid hood 160 is supported on casting 143 and closely overhangs chain 158 to prevent loosening of such chain on the sprocket wheel 157.

The power takeoff subassembly 180 comprises a bevel gear 181 which engages another bevel gear 182, and an output power shaft 186 directly connected to gear 182 and to a generator 187 on the ground 25. Bevel gear 181 is fixedly and firmly connected to and co-axial with the shaft support sleeve 39. The shaft 186 is rotatably supported in the tube 145 by bearings 184 and 185.

The rotation of the bevel gears 181 and 182 results from the rotation of the sleeve 39 which results in the rotation of the hub 30, which in turn results from the rotation of the rotor blades 31, 32 and 33, which rotation in turn is caused by the wind applied to such blade, and causes rotation of the shaft 186.

In start of operation of apparatus 20 the chain 178 is pulled and urges the screw shaft 152 to the left and thereby extends the collar 40 and the shaft 38 towards the maximum extension thereof from the rear end of sleeve 39, as shown by extreme position of collar 40 at position shown as in FIG. 10. The surfaces 131-133 of the vanes as 31-33 are usually at an angle to the direction of the wind as shown by position 331 for vane 31 in FIG. 10 which vane position is that shown in FIGS. 1 and 2 and 3 for vanes 31-33. In such position of the vanes the wind 70 causes the vanes 31-33 to rotate clockwise as viewed in FIG. 2; such clockwise direction is shown by the arrow 75 in FIGS. 2 and 3. While the vanes are urged by the wind moving in the direction 70, as shown in FIGS. 3 and 10, to move in a clockwise direction 75 around the central longitudinal axis of the shafts 38 and 39 each of the vanes as 31 also is urged to move in a counterclockwise rotary direction 50 about the axis of the straight portion 71 of the spar 61 to which each such vane is attached. When such vane motion in path 50, as shown in FIG. 10, occurs, it moves the blade surfaces as 131 towards a feathered position as at position 333 in FIGS. 3 and 10. On such motion along path 50 (a) the blades 31-33 draw the collar 40 and shaft 38, through the struts 34-36, toward the hub 30 in direction of arrow 90 of FIGS. 4 and 10; as a result (b) the head 37 of shaft 38 acts against the cap 154 and moves the screw shaft 152 forward (to the right as shown in FIGS. 1 and 4) and (c) the engagement of screw 152 and nut 151 rotates the sprocket sleeve 156 clockwise as seen in FIG. 2 and shown by arrow 95 in FIG. 4 and (d) the sprocket wheel lifts the chain portion 178 to which the weight 159 is attached. Once the weight is lifted off the ground 25, as shown in FIG. 4, the weight 159 tends to turn the sleeve 156 and screw shaft 152 counterclockwise as viewed in FIG. 2 and thus opposes further forward movement (in direction of arrow 90) of the shaft 152. As the vane rotation speed increases at a fixed position of blades 31-33 it develops a greater tensile force on struts 34-36 and a greater forwardly directed force (in direction of arrow 90) on shaft 152 and develops a greater turning force in direction of arrow 95 on sleeve 156 by engagement of screw shaft 152 and nut 151 fixed to the sleeve 156.

The weight 159 thus applies a constant torque to fix the orientation of the blades to the wind direction. Insofar as the force of weight 159 is thereby overcome (by the turning force in direction of arrow 95) collar 40 draws closer to hub 30 and each of the rotor blades as 31 then pivots the bent spar portion thereof as 81 about the straight portion as 71 of the spar therefor as 61; the surface 131 orientation of the blade as 31 then is changed to an orientation or position as 333 in FIGS. 3 and 10, whereat the angle of the blade surface to the direction of the wind decreases; i.e. the blade 31 "feathers". Thereby a steady state of angular relation of the windward surfaces 131, 132 and 133 of the rotor blades or vanes 31, 32 and 33 respectively is developed for any particular wind velocity and torque then opposing such turning of the blades. Thus, as the vane R.P.M. changes the orientation of the blades surfaces as 131-133 changes between the positions shown for surface 131 in FIG. 10 and the position 136 in FIG. 10 for the surface 131 of the blade 31, to automatically provide to the output shaft 186 a constant amount of net torque, set by the value of weight 159 regardless of the wind speed.

The torque required by the electrical generator 187 depends upon the voltage it generates and the current drawn from that generator so that the torque required to turn that generator depends upon the load taken by that generator which may be a variable. Such torque of the generator 187 resists motion of the shaft 186 which shaft drives that generator 187 and, like weight 159, resists motion of the rotor blades as 31-33 and of the hub 30. Accordingly, as force on the collar 40 which would tend to provide displacement thereof depends upon the reaction or the back torque developed by the generator 187 such torque needs to be overcome as well as torque provided by the weight 159 before longitudinal shift of the screw shaft 152 occurs. Accordingly, this apparatus 20 automatically provides for a constant output torque at shaft 186 which accommodates and automatically corrects for variation in wind velocity and also generator load. Thus, as the wind velocity increases the torque is kept contant by a shifting of the orientation of the rotor blade surfaces as 131-133. As the load taken by the generator increases a greater torque is provided and creates a shifting of the blade orientation relative to the wind so that the torque input into the generator stays constant notwithstanding variation load on the generator and, also, variation in wind velocity.

Figure 9:
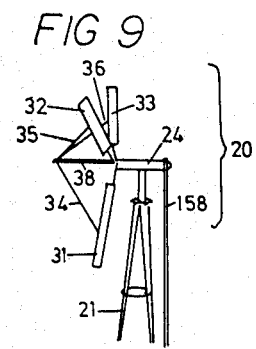
FIG. 9 shows a portion of the apparatus 20 in a position of its parts at which position blade 31 extends vertically downward from hub 30.
Figure 11:
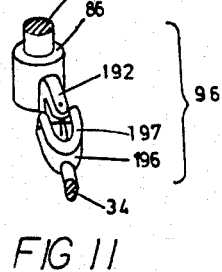
FIG. 11 is a perspective diagrammatic view of joint 96 in zone 11A of FIG. 3 showing details of a strut-vane connector in the run mode of the vane or rotor blade.
Figure 13:
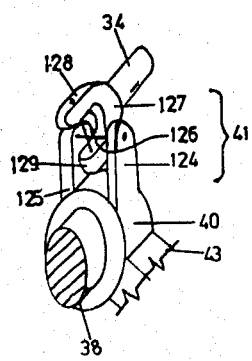
FIG. 13 is a diagrammatic perspective view of the strut-collar connector 41 in the run mode of the vane to which strut 34 is attached.

When the rotor blades pass behind the frame assembly 21 as shown in FIG. 9 the air flow velocity falls in its travel in the direction (70) past assembly 21 towards blade surfaces as, 131 then extending in the direction generally parallel to the vertical shaft 185 and downward from shaft 38. Such blade is briefly described as in the "shadow" of the tower or frame assembly 21.

In that position as shown in FIG. 9 the tension in the other rotor blades as 32 and 33 (then not in the "shadow") continues to urge the collar 40 forward and, also, at that moment in operation the strut 34 which is a rigid member, urges the universal hinge joint 96 to which the strut 34 is attached forwardly and thereby positively maintains the orientation of each of the blades as 31 while it is in the shadow of the tower or frame assembly 21 and so avoids development of vibration and oscillation of the blades because of the wind condition behind the frame assembly. The rigid attachment of each of the struts 34-36 by universal joints 96 and 97, 98 and 41, 42 and 43 prevents development of such undesired oscillation.

Each of the pivotal joints 41-43 on the collar 40 is like the joint 41 accordingly the description of joint 41 applies to the others. The joint 41 comprises a pair of rigid upstanding lugs 124 and 125 which support one, horizontal, arm of a rigid cross 126. The vertical arms of that cross 126 are joined to arms as 128 and 129 of a fork 127 and that fork is firmly joined to the rigid strut 34. This provides a readily flexible joint yet one that is dimensionally stable.

The universal joints 96-98 are the same in structure according to the description of 96 applies to the others. The universal joint 96 comprises a rigid arm 191, one end which is attached to the rigid sleeve 86 which firmly attaches to the spar portion 81 of the frame 51 of the blade 31. The other end of that rigid arm 191 is attached to a fork 192; the arms 193 and 194 of that fork support one arm of a rigid cross 195. The other arms of that cross 195 are rotatably supported by arms 197 and 198 of a fork 196 which is rigidly attached to the strut 34. The strut 34 is a rigid arm and the other end of the arm is attached to the fork 127 of the joint 41. Accordingly, there is a pivotal connection at the joints 96 and 41 and at the same time this connection is dimensionally stable so that the strut 34 and its joints serves as a weight or compression supporting element because the joints 41 and 96 to which strut 34 connects serve in combination with strut 34 as a dimensionally stable compression supporting assembly to hold the vane to which strut 34 is thereby connected in a fixed spatial relation to the collar 40 as when the vane is in the "shadow" of the frame assembly 21 as well as providing for pivoting of the vane surface as 131 around its support at spar portion 71 in hub 30.

In an alternative embodiment of joint for joint 96 a rigid arm 391 (corresponding to arm 191) supports a vertical arm on which a ball for a ball joint is located. That ball is engaged by a cap 395 with a spherical cavity therein; that cap is joined by a rigid arm 397 which attaches firmly to the strut 34 and thereby provides a rigid connection from the joint 41 to the vane 31 which, while dimensionally stable, is pivotal and allows the vane to change position as shown in FIGS. 3 and 10; thereby the position of the vanes 31–33 may be closely and accurately controlled by movement of the collar 40 relative to the rotor blade or vane surface 131.

Embodiment 26 is shown in FIGS. 3, 6 and 7 and is identical to apparatus 20 except for the substitution of control assembly 200 in zone 6A of FIG. 3 for the control assembly 24 in embodiment 20. Embodiment 26 comprises the frame assembly 21, the rotor assembly 23 and a control assembly 200. The rotor assembly 23 is on the same hub 30 as in apparatus 20. In the embodiment 26 as shown in FIGS. 6 and 7 the overall arrangement of a frame assembly as 21, a rotor assembly 22, and a control assembly is the same as in the apparatus 20 except that the embodiment 26 has a control assembly 200 that includes a electrical servo mechanism rather than the mechanical torque sensing and automatically responsive unit 24 used in embodiment 20.

In embodiment 26 a rigid motor shell 201 is rotatably supported for rotation about a horizontal axis by a rear bearing housing 204 and by a central bearing housing 203 in a rigid outer control assembly casing 208. Shell 201 is cylindrical and co-axial with and fixedly attached at its rear end to rotatable sleeve 239 and, thereby, to hub plate 170 and, at its front end, shell 201 is attached to output shaft 202. Shaft 202 drives an output bevel gear 182; the shaft 202 is rotatably supported in bearings 261 and 262 which are rigidly held by casing 208. Casing 208 is a rigid cylinder with a horizontal extending axis that is firmly supported on a rigid support 240; support 240 is fixedly mounted on a casting 144 of assembly 22 and thereby rotatably mounted on the platform 101 in the same rotatable manner as the control and rotor assembly 22 is mounted in embodiment 20.

An electrical sensing and control circuit 205 is mounted within the housing 208 and is operatively connected to a servo motor 212 which motor is an electrical driven motor which has a outer stator or shell that is firmly attached to the internal shell 201 and also has an output shaft that is firmly attached to the input of a speed reducer 210. The output of the speed reducer is firmly attached to a ball nut screw shaft 252, which is a rigid externally threaded shaft like 152 and is rotatably supported in sleeve 239; its threads engage a ball nut 251 like 151. Ball nut 251 is firmly attached to the front end of rigid control shaft 238. Shaft 238 has a longitudinally extending ball bearing engaging keyway 255 therein and, also, a recess 256 for movement of the rear end of shaft 252 therein. A rigid tubular extension, 249, of sleeve 239 is firmly attached to sleeve 239 and has a ball bearing engaging slot 250 therein. Ball bearing balls as 253 located in slot 250 extend into and engage keyway 255. Thereby shaft 238 is easily movable axially by shaft 252 parallel to the length of tube 239 in which it is slidably located. Tube 239 is a rigid steel sleeve and is co-axially with and firmly attached to hub plate 170 (which is the same as plate 170 in hub 30). Slip rings 214–217 contact wires connected to circuit 205 and provide for connection of a power and control source for a motor 212 and driving of such motor 212 to turn the screw shaft 252 relative to sleeve 239 and thereby move the control shaft end and collar 40 toward and away from the plate 170 under control of the sensor unit 206. Floating batteries as 188 are provided to be connected to and kept charged by the generator 187 for purpose of actuating motor 212 via the sensor circuit 205 or other control condition desired. When motor 212 is not turning screw shaft 252 a brake 211 supported in shell 201 and attached to the input to speed reducer 210 fixedly positions shaft 252 relative to shell 201.

The control shaft 238 has, at its outward end (left in FIG. 7) a spider or collar as 40 with joints 41, 42 and 43 attached to struts 33, 34 and 35. The bearings 203 and 204 within the casing 208 on which the entire housing 201 rotates provides, in combination with the control circuit 205, that the position of the rotor blades as 31, 32 and 33 is controlled by movement of the arm or shaft 238 within the sleeve 239 above described for embodiment 26. Thereby, for instance, the output voltage of the generator 187 connects into the sensor assembly 205 and acts therewith to control the motor 212 responsive to the voltage output the generator 186 (or 220) provides. Thereby the action of the rotors is responsive to conditions sensed at the control circuit 205. When voltage output of 187 falls below or rises above a certain amount the pitch of the rotor blades is controlled by motor 212 for a greater or lesser rotor blade speed (as by increasing or decreasing the distance of the collar 40 from the plate 170) and so control of pitch by the rotor blades.

Control circuit 205 may also have as input both the wind speed sensed by sensor unit 206 and the speed of the rotation of the shaft and, accordingly, automatically drive motor 212 for an adjustment of the orientation of the blades of assembly 23, as 31, for a predetermined speed or for maximum speed as well as for the maximum production of torque and speed. The apparatus 26 also provides for adjusting the rotor speed depending upon the torque developed by the rotors. Embodiment 28 is shown in FIG. 8. It provides a variation to the combination of elements in apparatus 26. In embodiment 28 the blade control assembly 200 is supported on a rigid housing 244 on which a electrical generator 220 also is located. Output shaft 202 above described in embodiment 26 directly drives generator 220. Housing 244 is supported on a casting as 144 as in embodiments 20 and 26 for rotatable position of the housing 244 and generator 220 for rotatably positioning about a vertical axis on a an elevated pedestal. As the housing 220 for electrical power generation is located at the top of the tower or frame assembly 21 only wires, as 246 are required for energy transmission to storage batteries 188 at the bottom of frame 21 inasmuch as the mechanical transmissions for electrical generation is accomplished at the top of the tower.

In apparatus 20, through the weight 159 attached to the chain 178 attached to the sprocket 157, a constant rpm is achieved by the vanes 31–33 because the spars 61–63 are tilted (at 84° to axis of shaft 38) as well as bent so as to cause each of those vanes to rotate about an axis (as 99) which is tranverse to shaft 38 and transverse to the length of the vane 31 as the speed of the vanes and the centrifugal force thereon increases, but due to controls of assembly 23, as the vanes rotate about the axes of spars 71–73 the relative blade angles to the wind decrease, which slows their rotation speed about the axis of shaft 38. For the apparatus 20, at 13 mph windspeed the apparatus will rotate at about 100 rpm, slowly increasing in speed with increasing windspeed reaching approximately 120 rpm in 100 mph winds.

As the pitch of the vanes are thereby varied or feathered, a constant speed at a variable torque is achieved even though the wind speed varies. The struts are attached to the vanes 31–33 by joints 96–98 at the centroid of force thereof and are dynamically balanced. Vibration loads are readily compensated for according to this invention by running at preselected rate of rotation. The ability of these apparatuses or as 20, 26 and 28 to operate at fixed rpm or fixed range of rpm avoids vibration problems. The blades are preferably made of aluminum and are twisted with the angle of surface 131 to the axis of shaft 38 being 2 to 4 degrees greater at the central vane surface edge 87 than at radial vane surface edge 88.

The ball screw 152 used in the exemplary embodiments 20 and 26 is a standard model as model R-55 of Rockford Ball Screw Company; it has a 1.0 inch lead and has a 1.140 inch root diameter and a 1.50 inch outside diameter; on nut 151 the ball diameter is 0.343 inch; the ball nut has a total length of 3⅝ inches and the threaded connection between nut and screw withstands a static load of 32,000 lbs. As shown in FIG. 4, the helical threads on shaft 152 are sloped upwards and to the right. The ball screw 152 and its nut 151 are shown diagrammatically in vertical longitudinal section in FIG. 4. Ball nut 251, which is substantially identical to ball nut 151, as shown in side view in FIG. 7.

In apparatus 20 the angle at 91 between portions as 71 and 81 of each spar as 61 is 12 to 14 degrees (12°–14°).

The length of the blade surfaces as 131 from the central edge 87 to the radial edge 88 thereof will range from 12 to 18 feet with all of the vane surfaces 131, 132 and 133 of the same size and shape and position relative to hub 30 in a preferred embodiment. Also, the attachment of joints 96–98 to each vane as 31–33 is between 50% and 66% of the distance from central edge 87 to radial edge 88 of each of the rear vane surfaces as 134 when the edges as 55 and 56 of the blades are parallel to each other (as shown in the drawings).

An extensible boot extends from rear end of support sleeve 39 to shaft 38 to cover shaft 38 for its maximum distance of travel during operation or may extend from rear end of support sleeve 39 to collar 40, as shown in FIG. 4.

The synchronizing assembly 222 promotes the synchronization of the rotation of the rotor assemblies 31–33. The synchronizing assembly 222 comprises a slider collar assembly 280 and a set of linkage assemblies 271, 272 and 273. The collar slider assembly comprises a rigid cylindrical sleeve 283 which forms a smooth sliding fit on the control shaft, as 338, of the rotor assembly with which assembly 222 is used. The same synchronizing assembly 222 is used on the rotor assemblies in apparatuses 20, 26, 27 and 29 as well as on assembly 226 for which this description is given.

The sliding collar or sleeve 283 has firmly attached thereto in radially equispaced array a set of clevises 284, 285 and 286. Each clevis as 284 is formed of a pair of rigid clevis arms as 287 and 288 alike in size and shape.

Synchrolinkage assembly 271 is applied to spar 71 of rotor blade assembly 31; linkage assemblies 272 and 273 are applied to the spars 72 and 73 of the rotor blade assemblies 32 and 33 respectively. Each of the linkage assemblies is made of components that have the same size and shape.

The synchrolinkage assembly 271 comprises a central slider-linkage arm 294, a ball joint 295 and a radial synchrolinkage arm 296, and a spar collar 297. The central arm 294 is pivotally fixed at one end at a pin 298 to the clevis arms as 287 and 288. The arm 294 is rigid and straight and is connected at its radial end distant from the pivot pin 298 to a ball joint 295. The ball joint firmly connects to one, outer, end of the radial arm 296; that arm 296 is rigid and connects at its other inner end to a rigid collar 297 which is firmly fixed to the spar 71. The arm 296 extends at right angles to the spar 71 and, in the run position of the blade to which the spar is attached, i.e., as shown in FIG. 20, with the surface of the blade, makes the greatest angle with the axis of the shaft 338 (or 39 in embodiment 20 and 26). On feathering of the blade as shown in FIG. 20 the spar 71 rotates and the arm 296, being fixed to that spar by the rigid collar 297, rotates correspondingly and the collar assembly 280 is moved rearwardly (downward as shown in FIG. 20 and to the left as shown in FIG. 17). The linkage assembly 272 is composed of a central arm 374, ball joint 375, a radial arm 376 and a collar 377 corresponding to the arm 294, joint 295, arm 296, and collar 297 of assembly 271. The linkage assembly 273 is formed of arm 494, joint 495, radial arm 496 and collar 497 corresponding to arm 294, joint 295, arm 296, and collar 297 of the synchrolinkage assembly 271. The arms 294, 374 and 494 are all of the same length and size and are rigid; the arms 296, 374 and 496 are all the same size and length and rigidity and the distance from the pins of clevises 284, 285 and 286 to the joints 295, 375 and 495 are the same and the center to center distances from the center of joints 295, 375 and 495 to the center of the collars therefor 297, 377 and 497 respectively, are the same. Accordingly movement of an assembly as 271 caused by rotation of one of the spars as 71 which causes a given longitudinal motion of the collar 283 along the shaft as 338 (or 39) therein provides that the same amount of rotation is applied through that linkage assembly 222 to the other spars as 72 and 73. Thereby all of the spars and the blades attached to those spars undergo the same amount of rotation relative to the axis of the shaft 338 (or sleeve 39 in embodiments 20 and 26) and compensates for flexibility of spars and of the struts as 34–36 and prevents variation of angle of the rotor blades or vanes 31–33 because of dimensional changes concomitant on such flexibility and so improves the smoothness of operation of the rotor assembly 23. In FIG. 21, the synchronization assembly 222 is shown added to the rotor assembly 22 of apparatus embodiment 20; that combination of apparatus is referred to as apparatus embodiment 27. The addition of the synchronization assembly 222 to rotor assembly 22 of apparatus embodiment is shown in FIGS. 17 and 19; that combination of apparatus is apparatus embodiment 29.

The apparatus embodiment 226 is shown in FIGS. 15 and 22 and is identical to apparatus 20 except for the substitution of control assembly 224 in zone 19A of FIG. 17 for the control assembly 24 in embodiment 20 and incorporation of synchronization assembly 222 in rotor assembly 23. Embodiment 226 comprises the frame assembly 21, the rotor assembly 23 and a control assembly 224. The rotor assembly 23 is on the same hub 30 as in apparatus 20 with addition of synchronization assembly 222. In the embodiment as 226 shown in FIGS. 15 and 22 the overall arrangement of a frame assembly as 21, a rotor assembly 23, and a control assembly is the same as in the apparatus 20 except that the embodiment 226 has a control assembly 300 that includes an electrical servo mechanism within control assembly casing 308 rather than the mechanical torque sensing and automatically responsive unit 24 used in embodiment 20 and rather than the screw mechanism outside of the housing 208 in embodiment 26.

The control assembly 224 comprises, in operative combination, a rigid shell assembly 308, a blade control shaft 338, a power takeoff assembly 380 and a shaft actuator assembly 350. The shell assembly 308 comprises a rigid rear casing portion 344, a rigid central casing portion 345, a rigid front casing portion 346 and a lower base casing portion 347. These are firmly joined together (as by bolts as 348). Shell assembly 348 surrounds a T-shaped shell assembly cavity 382. A ring bearing 165 rotatably supports the shell assembly 308 on the pedestal 107 of the frame assembly or tower 21.

Lower bearings 360 and 361 fixed in the casing portion 347 rotatably support output shaft 381 and lower bevel gear 282 within the cavity 382 of the shell assembly. Bearings 463 and 464 in casing portion 346 rotatably support a rigid cylindrical sleeve 339. Bearings 304 and 303 rotatably support the shaft 302 of a pinion gear 315.

Blade control shaft 338 comprises a rigid cylindrical shaft portion 358 an expanded head 337 (like head 37 in FIG. 4) and a cavity 356.

Blade control shaft 338 is slidably located in sleeve 339 to move longitudinally thereof, i.e., parallel to the length of axis of rigid actuator shaft 338, and to rotate therein. The rear (left as in FIG. 22) end of shaft 338 is a solid shaft fixedly connected to the collar 40 and slidably supports the slidable collar assembly 280 near hub 30.

The power take-off assembly 380 comprises the hub plate 170, a rigid sleeve 339, pinion gears 316 and 315, the shaft 302 for one pinion gear, bevel gears 281 and 282 and an output connector 383.

The turning power which the vane assemblies produce through action of the wind thereon turns the plate 170: the sleeve 339 is firmly attached thereto and to the gear 316. The sleeve 339 is firmly and rotatably held in the bearings 363 and 364. The gear 316 drives the gear 315 which it engages. Gear 315 is supported on and firmly attached to the rigid shaft 302; that shaft is rotatably supported on bearings 303 and 304 and is firmly attached to a bevel gear 281 which drives the bevel gear 282; that bevel gear 282 drives the shaft 381 which via coupling connector 383, drives the shaft 186 and generator 187.

The shaft actuator assembly 350 is attached to and controls the movement of the blade control shaft 338. The shaft actuator subassembly 350 comprises a helically grooved nut 351, a helically threaded shaft 352, a cap 354 (like cap 154) and a cap guide assembly 367.

The nut 351 is like nut 151 in FIG. 4 and has internal helical threads which match the helical threads on shaft 352, which is a rigid externally threaded shaft like 152 and is rotatably supported on cap 354; its threads engage a nut 351. Cap guide assembly 367 comprises brackets 362 and 363, a rigid control rod 364, a control block 365 and a guide plate 366.

The cap 354 is C-shaped in section. It has an inturned shoulder 337 and smoothly seats as well as holds and embraces an enlarged cylindrical head 337 of shaft 338. Head 337 is rigid and has a greater diameter than shaft 388 and the head 337 is co-axial with and firmly fixed to the rigid shaft 338.

Ball nut 251 is firmly attached to the rear end of rigid control cap 354. Shaft 338 has a longitudinally extending recess 356 for movement of the rear end of shaft 352 therein. Thereby shaft 338 is controllably movable axially by shaft 352 parallel to the length of tube 339 in which it is slidably located. Tube 339 is a rigid steel sleeve and is co-axially with and firmly attached to hub plate 170 (which is the same as plate 70 in hub 30) and provides for longitudinal motion of the shaft 338 along the direction of the axis of the shaft 338. Bearing 339 is firmly located within a rigid wall in casing 341 and that bearing is coaxial with the hole in the nut 351 and with the shaft 352 and with the shaft 338.

The rigid guide plate 366 is firmly attached to the cap 354 and the cap is firmly attached to the grooved nut 351. The guide plate is firmly attached to the block 365 which is a rigid block and smoothly and slidably fits on a rigid guide rod 364. The guide rod 364 is firmly held by the brackets 362 and 363 to the casing 308. Thereby, on rotation of the helical shaft 352 the cap 354 moves forward (to the right as in FIG. 22) or rearwardly (to the left as in FIG. 22). The head 337 freely rotates within the cap 354 and is movable longitudinally of the helical shaft 352 on turning of the shaft 352. The firm location of the helical shaft 352 within the bearing 301, which bearing is firmly attached to the casing 308 by a support therefor as 357, and the rotatable yet firm attachment of the C-sectioned cap 354 and bearing 353 to shaft head 337 and the location of the shaft 338 within the bearing 339 within the casing portion 346 provide that the shaft 338 is movable longitudinally along the axis of that shaft depending upon the rotation of the threaded shaft 352, as the block 365 attachment to the rod 364 prevents rotation of the cap 354 or bearing 351.

An electrical sensing and control circuit 305 is mounted within the housing 308 and is operatively connected to a servo motor 312 which motor is an electrical driven motor which has an outer stator or shell that is firmly attached to the internal shell 308 and also has an output shaft that is firmly attached to the input of a speed reducer 310. The output of the speed reducer is firmly attached to ball nut screw shaft 352 so helical shaft 352 is moved by motor 312 operating through speed reducer 310 and a clutch 315. A brake 311 serves to hold shaft 352 in position when it is not desired to be moved. The motor 312 and the brake 311 are under control of the sensor and control circuit 305. In the overall, circuit 305 provides for connection of a power and control source for motor 312 and driving of such motor 312 to turn the screw shaft 352 relative to ball nut 351 and thereby move the control shaft 338 end and collar 40 toward or away from the plate 170.

The control shaft 338 has, at its outward end (left in FIG. 22) a spider or collar as 40 with joints 41, 42, and 43 attached to struts 33, 34 and 35 as in assembly 20 and 26. Accordingly, the position of the rotor blades as 31, 32 and 33 is controlled by movement of the arm or shaft 338 within the sleeve 339 along the length of shaft 338.

When motor 312 is not turning screw shaft 351 a brake 311 supported in shell 308 and attached to the shaft of motor 312 serves to fixedly position shaft 352.

Floating batteries as 188 are provided and connected to and kept charged by the generator 187 for purpose of actuating motor 312 via the sensor unit 305.

Figure 23:
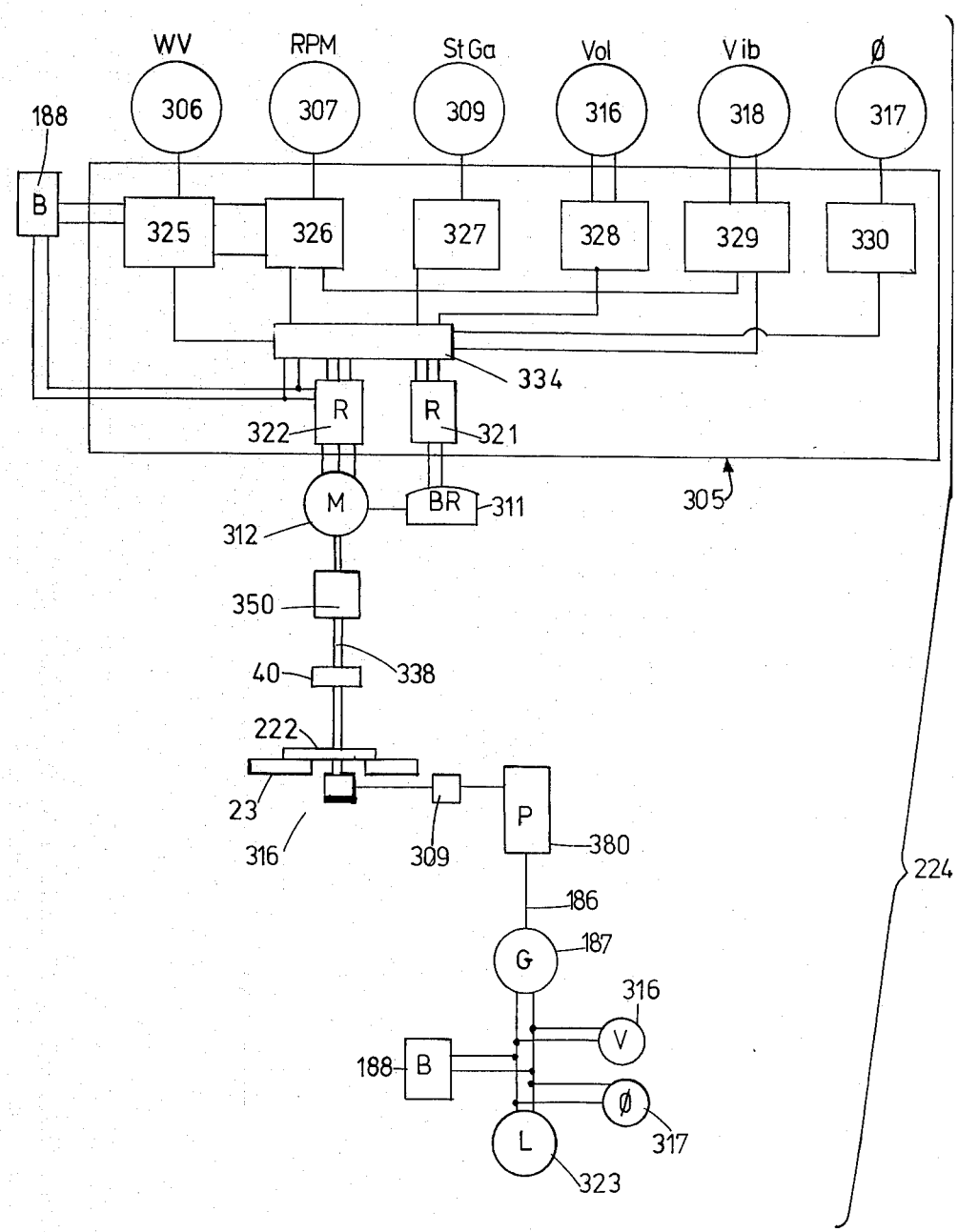
FIG. 23 is a diagram showing relations of subassemblies used with the sensor control assembly 305.

The sensor and control assembly 305 comprises, as diagrammatically shown in FIG. 23, in operative combination, a wind speed sensor 36, a revolutions per minute sensor 307, a strain gauge assembly 309, a voltage sensor 316, a phase angle sensor 317, vibration sensor 318, a factor memory and comparator assembly circuit 320, a power input 319, a logic circuit 331, a motor forward and reverse relay 321, and a brake relay 322.

The wind speed sensor is mounted on casing 308 to provide to the circuit 320 a measure of the wind speed. The r.p.m. sensor 307 reads the r.p.m. of the shaft 338 and thereby determines the r.p.m. of the rotor blade assembly 23 and transmits such information to the memory and comparator assembly circuit. The strain gauge assembly 309 measures the torque applied by the rotor assembly and transmits such information to the memory and comparator circuit 320; the power input 319 is connected to a floating battery 188 or otherwise, as by a Zener diode circuit, provides a fixed voltage to the memory and comparator circuit 320.

The memory and comparator circuit 320 comprises a plurality of sections as 325-330, each comprising a memory and comparison circuit or unit into which information on a particular parameter, such as wind velocity (in unit 325), r.p.m. (in unit 326) strain gauge resistance (in unit 327), voltmeter reading (in unit 328), vibration presence (in unit 329) or phase angle (in unit 330) are respectively stored. These units 325-330 may be electromechanical units or integrated circuit units or packages. The memory thereof may be a simple mechanical setting of tension in the spring of an electromagnetic relay by adjustment of a screw therefor or the memory may be provided by integrated circuits of the read only memory type after programming. The comparison portion of each of the circuit units 325-330 compares the incoming signal with the input from the memory portion and provides an output repesentative of the difference between such actual input and the desired condition of which such measurement is made.

The logic circuit 334 for the motor forward and reverse relay 322 is actuated by the memory and comparator assembly circuit 320 and is powered by input 319 and drives the motor 312 (a) forward or (b) backward or (c) not at all depending upon the signals supplied thereto. When the motor relay 321 is not actuated to provide forward or reverse action to the motor 312, the circuit 320 inhibits application of power to relay 321 for the solenoid in the brake 311, and the brake 311 locks the shaft 352 in position.

In operation of the control assembly 305 the output torque developed by the rotor assembly 23 may be sensed by a strain gauge assembly 309 on shaft 302. The torque may also be measured by measurement of the output voltage of generator 187 (driven by shaft 186 and power take off assembly 380) if generator 187 is a direct current generator; the output torque may also, alternatively be measured at phase angle sensor 317 by the phase angle developed when the generator 187 is an alternating current generator as well as by the phase angle at the generator output when the generator 187 is connected to an a.c. power line, 323.

At a given wind velocity the torque output from assembly 23 is proportionate to the r.p.m. of assembly 23 at a particular angle of the blades to the axis of shaft 338 (or 38). Accordingly the torque may be measured at sensor 307 by measurement of the r.p.m. rotor assembly 23 when the wind velocity is known. In operation the torque reading from sensor 309 or from r.p.m. sensor 307 and wind velocity sensor 306 may be fed into a memory and comparator circuit 320; the circuit 320 in turn feeds a proportionate or representative output signal into the motor and brake relays 322 and 321 respectively representative of the determination in the comparator circuit of whether more or less torque or speed is required.

The motor relay 321 passes power to the motor 312 if a change in setting of the blade assembly 23 is needed; if no change is needed the brake 311 seizes the shaft 352; if a change is needed a solenoid is actuated by circuit 305 and releases the brake; that control circuit 305 concurrently energizes the motor 312 to move the shaft 352 clockwise or counterclockwise depending upon the movement of shaft as 338 and collar as 40 required to maintain the desired output torque of assembly 23. The movement of struts 34-36 concomitant on the movement of the collar 40 changes the angular relation of the blades as 31-33 to the axis of shaft 338 with a concomitant change in torque developed by the rotor assembly 23 with that particular wind velocity. The power train comprised of blades 31-33, spars 71-73, plate 170, sleeve 339, gears 316, 315, 281 and 282 then energize the generator 187. The phase angle or change in phase angle is measured at sensor 317 where generator 187 has an alternating current output and the generator output voltage may be measured at voltmeter 316 where the generator has a d.c. output. A signal representative of such measurement is fed back to the control assembly 305 and is compared with a standard in the memory of the control assembly 3 to initiate or to inhibit further movement of the shaft actuating by disconnecting power to the motor 312 and applying the brake 311 to shaft 352 when the desired output is obtained. The combined inputs from the wind velocity measurement apparatus 306 and r.p.m. sensor 307 may also be used to control initiation of movement of the shaft actuating assembly 350 in view of torque measurements. When vibration of rotor assembly 23 occurs the r.p.m. sensor is actuated to put into memory the r.p.m. value at which such vibration occurred and thereby set later torque values to avoid those values thereof that would provide such r.p.m. values of assembly 23.

Additionally the output of the generator 187 connects into the sensor assembly 305 and acts therewith to control the motor 312 responsive to the output which the generator 187 (or 220) provides. Thereby when the output of 187 falls below or rises above a certain amount the pitch of the rotor blades is controlled by motor 312 for a greater or lesser rotor blade speed (as by increasing or decreasing the distance of the collar 40 from the plate 170) respectively and a steady generator output results.

I claim:

1. In a windmill comprising a tower and a plurality of airfoil blades, means for controllably adjusting the pitch of the airfoil blades from a feathered position to any run position relative to the direction of the wind, said means comprising:

an elongated sleeve member,
an actuator shaft coaxially extending through said sleeve, said shaft rotatable with said sleeve and longitudinally moveable relative to said sleeve,
hub means coupled to said sleeve for rotation therewith,
a plurality of elongated spar members equal in number to the number of airfoil blades, each of said spar members having a central portion rotatively in fixed spatial relation to and rotatably supported on said hub at an angle to the axis of said actuator shaft and a peripheral portion angularly extending from said central portion and fixedly connected to one of the blades, said blades extending rearwardly and radially from said hub, said hub located rearward of said tower collar means mounted for rotation with said actuator shaft, elongated rigid strut means pivotally connected at each end respectively to said collar means and to the airfoil blade intermediate its ends, and control means operatively coupled to said actuator shaft for longitudinally moving said shaft and, through said strut means, rotating each of the blades beween and including the feathered position and any run position and moving each of the blades in an arcuate path for changing the dihedral angle of the blades, and spar synchronization means connected between the central portion of each of said spars and said actuator shaft whereby to maintain the same angular relations between each of said spar members.

2. Apparatus as in claim 1, wherein said spar synchronization means comprises:
(a) rigid means slidable longitudinally along said actuator means, (b) for each of said rotor blades first rigid arm means, a second rigid arm means, a ball joint therebetween, (i) said first rigid arm means attached at one end thereof to and extending transversely to the length of the central portion of the spar of said rotor blade and, at a second distant end thereof, to said ball joint and (ii) second rigid arm means pivotally connected at one end to said longitudinally slidable means on said blade control shaft and, at a second distant end thereof, to said ball joint.

3. Apparatus as in claim 1 wherein said control means comprises a sensing means sensitive to the torque developed at said actuator shaft, said sensing means operatively attached to a motor means including a bearing movable along the length of said actuator shaft and operatively connected to said actuator shaft.

4. Apparatus as in claim 3 wherein said control means comprises a comparator means operatively connected to said torque sensing means.

5. Apparatus as in claim 1 wherein said control means comprises a brake relay and a brake, said brake relay operatively connected to said control means and said brake operatively connected to said actuator shaft.

6. Apparatus as in claim 3 wherein such control means comprises a vibration sensing means and a memory means, said vibration sensing means operatively connected to said memory means and said memory means operatively connected to said control means.

* * * * *